United States Patent [19]

Theodoras, II et al.

[11] Patent Number: 5,663,731
[45] Date of Patent: Sep. 2, 1997

[54] METHOD AND APPARATUS FOR TIME INVARIANT PULSE DETECTION

[75] Inventors: James T. Theodoras, II; Thomas G. Xydis, both of Ann Arbor, Mich.

[73] Assignee: IMRA America, Inc., Ann Arbor, Mich.

[21] Appl. No.: 519,175

[22] Filed: Aug. 25, 1995

[51] Int. Cl.$^6$ ............................ G01S 13/93; G01S 7/292
[52] U.S. Cl. .................................................. 342/70; 342/91
[58] Field of Search ................................... 342/70, 71, 72, 342/92, 91, 115, 162, 188, 189

[56] References Cited

U.S. PATENT DOCUMENTS

| | | | |
|---|---|---|---|
| 3,532,905 | 10/1970 | Zijta | 308/265 |
| 3,906,377 | 9/1975 | Harris | 328/108 |
| 3,940,694 | 2/1976 | Price et al. | 364/722 |
| 4,001,825 | 1/1977 | Burgers | 342/199 |
| 4,226,245 | 10/1980 | Bennett, Jr. | 607/27 |
| 4,495,529 | 1/1985 | Gustafson | 360/46 |
| 5,210,397 | 5/1993 | Eastman | 235/436 |
| 5,243,553 | 9/1993 | Flockencier | 356/5 |

*Primary Examiner*—John B. Sotomayor
*Attorney, Agent, or Firm*—Burns, Doane, Swecker & Mathis, LLP

[57] ABSTRACT

According to the present invention, a relatively straightforward, cost-effective technique for eliminating and/or reducing inaccuracies, such as amplitude induced timing errors, is provided in a pulse detection system without reducing bandwidth or degrading the signal-to-noise ratio. Exemplary embodiments detect a change in polarity of slope in a pulse of received energy to provide accurate pulse detection in the presence of noise, without degrading signal-to-noise ratio. Exemplary embodiments can create a time-invariant pulse from a single received, amplitude variant pulse, wherein a rising edge of the detected pulse is coincident with a change in a polarity of slope of the received pulse. Thus, a repetitive pulse signal is not needed to provide accurate pulse detection. Further, exemplary embodiments eliminate any need for complex circuitry since, for example, they are based on using cost-effective differentiators and do not require a reset signal to be asserted between pulses. In addition, exemplary embodiments do not strip the pulse-width information from the received signal, but rather can produce an output pulse which is proportional in width to the received pulse.

21 Claims, 9 Drawing Sheets

METHOD AND APPARATUS FOR TIME INVARIANT PULSE DETECTION

BACKGROUND OF THE INVENTION

1. Field of the Invention

The present invention generally relates to detecting a pulse of received energy in the presence of noise. More particularly, the present invention relates to a method and apparatus for distinguishing a time-invariant pulse in a received signal, the detection of the pulse being independent of amplitude variations in the received signal and being performed without degradation in signal-to-noise ratio. The invention is applicable in systems which, for example, employ pulse transmission for time-of-flight measurements.

2. State of the Art

Figure 1:
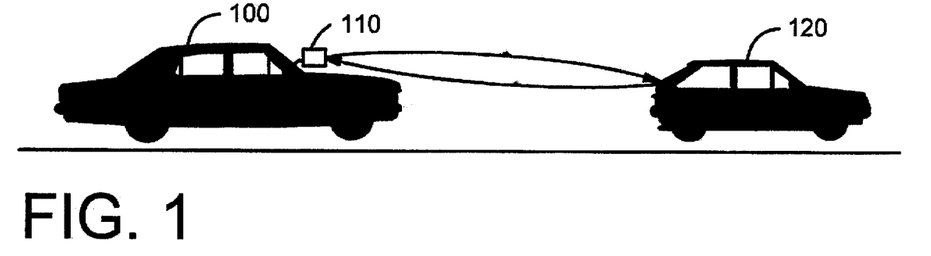
FIG. 1 depicts a typical automotive radar system.

Pulse detection and measurement have become important in time-of-flight measurement applications such as automotive radar systems for collision avoidance. In such systems, an optical or electromagnetic pulse having a predetermined pulse shape is transmitted from an object, such as a vehicle, and used to detect the distance between that object and another object. FIG. 1 shows an example of a typical automotive radar system in which a radar device 110 is mounted on a vehicle 100. The radar device 110 emits a pulse which, as shown in FIG. 1, is transmitted to and reflected by a vehicle 120 and then received by the radar device 110. The time it takes for the pulse to travel to and from the Vehicle 120 is typically measured with a counter to provide an indication of the time of flight.

Figure 2:
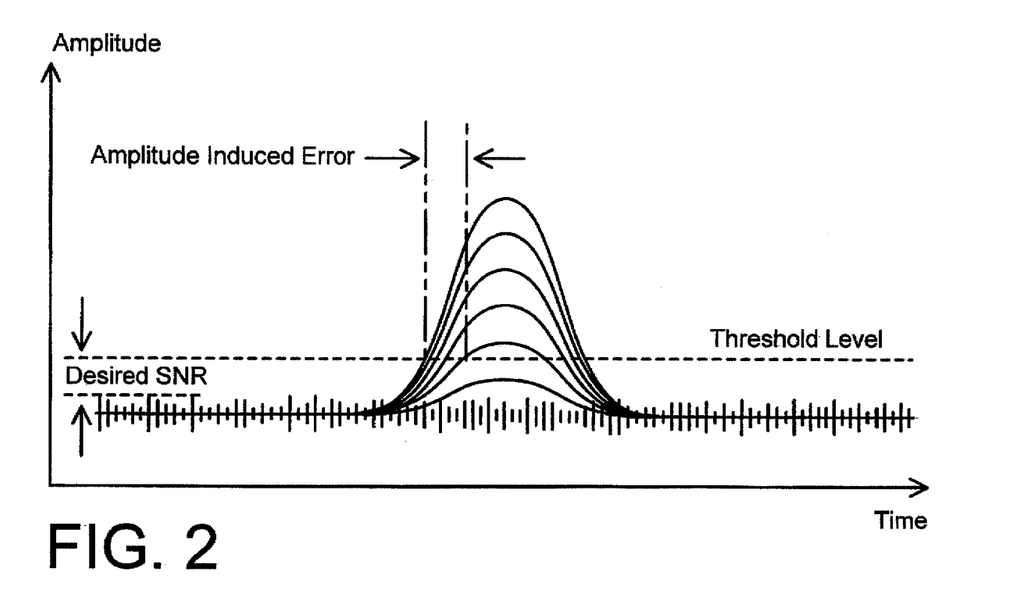
FIG. 2 graphically depicts an amplitude induced error.

Because of the many variables which can influence the pulse between the time it is transmitted and the time it is received (such as the distance the pulse actually travels, the reflectivity of the surface which reflects the pulse, and so forth), amplitude variations from one pulse to the next are inevitable. FIG. 2 graphically depicts a problem of amplitude induced error that can occur due to amplitude variations in pulses of received energy. FIG. 2 illustrates a pulse of received energy which is detected using a counter when the pulse amplitude reaches a predetermined threshold which is set at a desired signal-to-noise ratio (SNR). FIG. 2 further illustrates how variations in amplitude influence the time at which the pulse reaches the threshold, and thus the time at which the pulse is detected by the counter. In other words, there is an amplitude induced error in the time-of-flight measurement of each pulse. The amplitude induced error represents the range in time over which pulses of differing amplitude intersect the threshold level, the exact point of intersection for each pulse being related to the pulse's amplitude.

In the past, amplitude induced errors were simply ignored because of the poor resolution of conventional counters. That is, the relatively low resolution of conventional counters was unaffected by the time variations associated with detecting the leading edge of a pulse influenced by amplitude induced errors. However, as technology has progressed, counters with higher resolutions have been developed, and the amplitude induced errors can no longer be ignored without risking pulse detection errors. Thus, various approaches have been used in attempts to improve the accuracy of pulse detection.

U.S. Pat. No. 5,243,553 discloses a pulse detection system in which a received pulse is digitized in a comparison circuit and a gate array circuit, stored in a RAM, then analyzed with an algorithm to determine a position of the pulse center. The analysis of the stored pulse involves mathematical correlation of the pulse with a template. This approach is very complex, expensive and slow, requiring storage of earlier pulse information. Additionally, the use of analog-to-digital conversion limits the bandwidth of the system, thus lowering the maximum resolution obtainable.

U.S. Pat. No. 3,906,377 discloses a second approach for pulse detection using a dual-integrating pulse centroid detector. As described therein, two integrators, a summer, and a zero crossing detector are employed to determine a centroid of a pulse. This approach requires the use of repetitive pulses to find the centroid of a pulse and is therefore impractical for use in detecting a single received pulse. Further, this approach is difficult to implement at higher bandwidths, requires the use of complex operational amplifiers for accuracy, and requires that a reset signal be asserted once a pulse has been detected (that is, subsequent to receipt of the multiple, repetitive pulses) to zero the integrators.

U.S. Pat. No. 4,495,529 discloses another approach for pulse detection on computer hard disk drives. This approach was developed to correct errors caused when a long string of zeroes is received by the read head of a hard disk drive. As described in this patent, a train of pulses are received by a read head, differentiated and their zero-crossing points determined in a zero-cross detection comparator. The train of pulses is also delivered to circuits for detecting and holding peak positive and negative voltages as reference levels for two window comparators. Signals from the zero-cross comparator and the window comparators are input to digital logic gates which compensate for a long string of zeroes. As with the approach of U.S. Pat. No. 3,906,377, this approach requires repetitive pulses and does not work at high bandwidths or with very fast pulses, (for example, bandwidths greater than 50 Megahertz (Mhz) and pulse widths less than 50 nanoseconds (ns)). This approach also requires information about previous pulses to determine the peak positive and negative voltages, which requires excessive hardware and severely limits maximum bandwidth. Further, this approach uses a digital feedback circuit to create a fixed pulse width which is not related to the actual width of the received pulse, and thus provides no pulse width information.

Other approaches also exist which are directed to detecting pulse edges rather than pulse centers. For example, U.S. Pat. No. 3,532,905 discloses constant-fraction detection of the leading edge of an incoming pulse. According to this approach, both the pulse and a delayed, attenuated version of the pulse are input to a comparator such that the leading edge is detected via a threshold which represents a percentage of the pulse's amplitude. U.S. Pat. No. 5,210,397 discloses a system in which a pulse labelled TP1 is differentiated and integrated. The differential signal TP2 is compared to a delayed version of the integrated signal, resulting in a signal TP3 that transitions on the edges of the received pulse TP1. Both of these approaches are thus directed to pulse edge detection. However, while the detected edges are relatively time-invariant, the centers remain time-variant and therefore susceptible to amplitude-induced errors.

Thus, there is a need for simply and inexpensively eliminating or reducing amplitude induced timing errors in a pulse detection system, without lowering the bandwidth or the signal-to-noise ratio (SNR). In so doing, it would be desirable to eliminate any need for complex or surplus circuitry (such as circuitry that asserts an integrator reset signal between each pulse). Further, it would be desirable to provide accurate pulse detection without stripping the received signal of original pulse-width information.

SUMMARY OF THE INVENTION

According to the present invention, a relatively straightforward, cost-effective technique for eliminating and/or reducing inaccuracies, such as amplitude induced timing errors, is provided in a pulse detection system without reducing bandwidth or degrading the signal-to-noise ratio. Exemplary embodiments detect a change in polarity of slope in a pulse of received energy to provide accurate pulse detection in the presence of noise, without degrading signal-to-noise ratio. Exemplary embodiments can create a time-invariant pulse from a single received, amplitude variant pulse, wherein a rising edge of the detected pulse is coincident with a change in a polarity of slope of the received pulse. Thus, a repetitive pulse signal is not needed to provide accurate pulse detection. Further, exemplary embodiments eliminate any need for complex circuitry since, for example, they are based on using cost-effective differentiators and do not require a reset signal to be asserted between pulses. In addition, exemplary embodiments do not strip the pulse-width information from the received signal, but rather can produce an output pulse which is proportional in width to the received pulse.

According to one aspect of the invention, an apparatus for detecting a pulse of energy in the presence of noise comprises means for receiving energy, means for determining a change in polarity of slope of a pulse of the received energy, means for producing a reference pulse having a width related to the width of the pulse of received energy, and means for combining the change in polarity of slope and the reference pulse to produce a pulse output. According to one embodiment of the invention, the means for combining comprises an AND gate. According to another embodiment of the invention, the means for combining comprises a threshold comparator wherein the reference pulse serves as one input of the comparator and the determined change of polarity in slope as the other input of the comparator.

According to another aspect of the present invention, an apparatus for detecting a pulse of energy in the presence of noise comprises an input for receiving energy and two channels. A first channel includes a differentiator which differentiates a pulse of the received energy to produce a differentiated output, an amplifier and an inverter which amplify and invert the differentiated output, and a first threshold comparator which compares the inverted output with a first predetermined threshold. A second channel includes a pulse stretching circuit which stretches a pulse of the received energy, the stretched pulse being time-aligned with the inverted output, and a second threshold comparator which compares the stretched pulse to a second predetermined threshold for establishing a desired signal-to-noise ratio (SNR). The outputs of the first and second channels are combined to produce a detected pulse of energy. According to one embodiment of the invention, the apparatus further comprises an AND gate for combining an output of the first threshold comparator and an output of the second threshold comparator to produce the detected pulse of energy. According to another embodiment of the invention, the output of the second threshold comparator and the inverted outputs are combined in the first threshold comparator to produce the detected pulse of received energy.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 3:
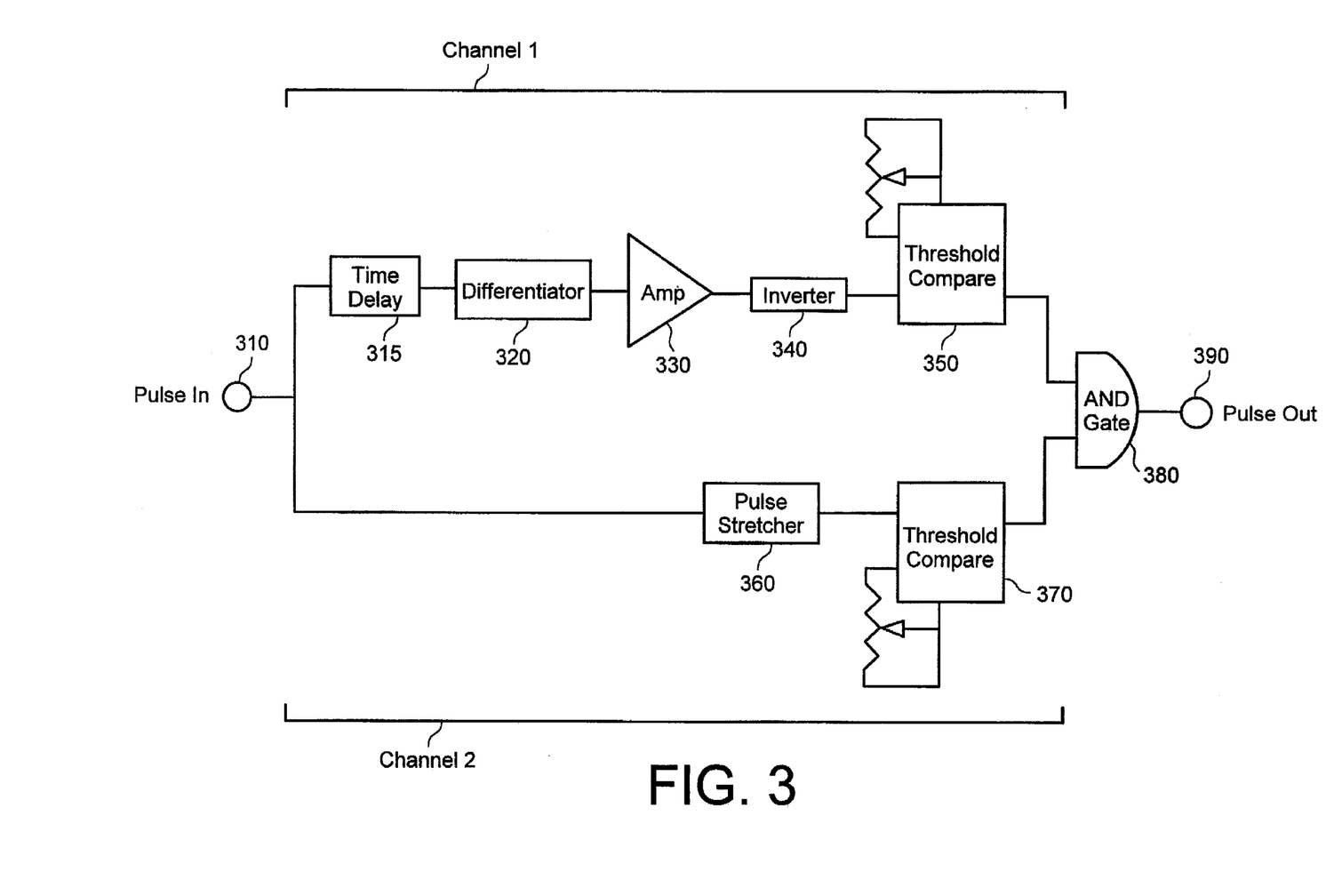
FIG. 3 depicts a block diagram of a pulse detection apparatus according to a first embodiment of the present invention.

FIG. 3 depicts a block diagram of a pulse detection apparatus according to a first exemplary embodiment of the present invention. Referring to FIG. 3, the pulse detection apparatus comprises a means, such as an input 310 for receiving a pulse of energy. The pulse is supplied to a means for determining a change in polarity of slope of the pulse of received energy, such as a first channel 1 of two channels. Further, the pulse is supplied to a means for producing a reference pulse having a width related to a width of the pulse of received energy, represented as a second channel 2 of the two channels. Further, the FIG. 3 apparatus includes a means, such as an interconnect outputs from the two channels, for combining said change in polarity of slope and the reference pulse to produce a pulse output.

Channel 1 includes a time delay circuit 315, a differentiator 320, an amplifier 330, an inverter 340, and a threshold comparator circuit 350. Channel 2 includes a pulse stretcher 360 and a threshold comparator 370.

According to the exemplary FIG. 3 embodiment, the time delay circuit 315 precedes the differentiator 320, and channel 2 stretches a pulse of energy to yield proper time-registration of channel 2 with channel 1. The time delay circuit 315 can be implemented, for example, as increased wire length in combination with a propagation delay through the amplifier 330. Those skilled in the art will appreciate that the time delay circuit 315 is shown preceding the differentiator 320 merely for illustrative purposes, and that the time delay can be implemented in any appropriate portion of the pulse detection apparatus which ensures proper time-alignment of the signals output from channel 1 and channel 2. For example, the time delay can be separately provided or incorporated in any one or more components of channel 1 and/or channel 2.

Proper time registration between the two channels is important, since the various processes performed by the channels can generate time delays. Depending upon the technique used to implement the system, different time-aligning techniques might be required. As described above, the time delay can be implemented in channel 1, channel 2, or in both channels. The appropriate time delay can, for example, be determined empirically by examining the signals at the input to the AND gate 380. Alternately, the delay can determined by predicting the delay required for time-alignment, or by simulating the circuit performance using known simulation techniques.

In an exemplary embodiment, a simple resistor-capacitor (RC) circuit can be used as the differentiator 320. The amplifier 330 can be implemented using discrete transistors, resistors and capacitors. In exemplary embodiments, the amplifier 330 is very fast with regard to pulse bandwidth, and the gain for the amplifier 330 is selected to return the gain of the signal to its original amplitude (for example, a gain on the order of 20 decibels for ultrashort pulses having bandwidths on the order of 50 Megahertz or greater). The inverter 340 can be supplied separately or can be implemented in combination with the amplifier 330 in an inverting amplifier.

The threshold comparator 350 can be implemented as a conventional off-the-shelf comparator, for example a half of Motorola MC10E1652. The reference level of the threshold comparator 350 can be set at the least time-variant point of the pulse received on channel 1 using a potentiometer. The potentiometer can, for example, be set to ground to detect the least-time variant point as the zero-crossing point in the pulse received in channel 1. Alternately, the least time-variant point can be empirically determined using an oscilloscope. In this later case, the potentiometer is varied until the output of the threshold comparator 350, as it appears on the scope, shifts the least from left to right as the input amplitude is varied. In accordance with exemplary embodiments, this point is often the zero crossing point such that the potentiometer is set to ground.

Referring to channel 2, the pulse stretcher 360 can be implemented, for example, with an emitter-follower transistor, a capacitor and resistors. Alternately, pulse stretching can be obtained using any pulse stretching technique readily known to those skilled in the art and including, but not limited to, use of delay lines, a bandwidth limited amplifier that is slower than the amplifier 330, integrators, and so forth. Those skilled in the art will appreciate that pulse stretching is not always necessary in channel 2 and can, in some circumstances be eliminated, depending on the time alignment requirements for the pulse passing through channel 1.

The threshold comparator 370 can be implemented with a conventional off the shelf comparator, for example a second half of Motorola MC10E1652. The threshold level is set to a desired SNR. The noise is measured, and if it exceeds the desired SNR, the threshold level is lowered until the SNR is at the desired level.

Channels 1 and 2 are combined in a logic gate 380, for example, an AND gate 380 which can be implemented with off-the-shelf logic circuitry, for example Motorola MC10EL05D. The combined signal is then output at point 390.

Figure 4:
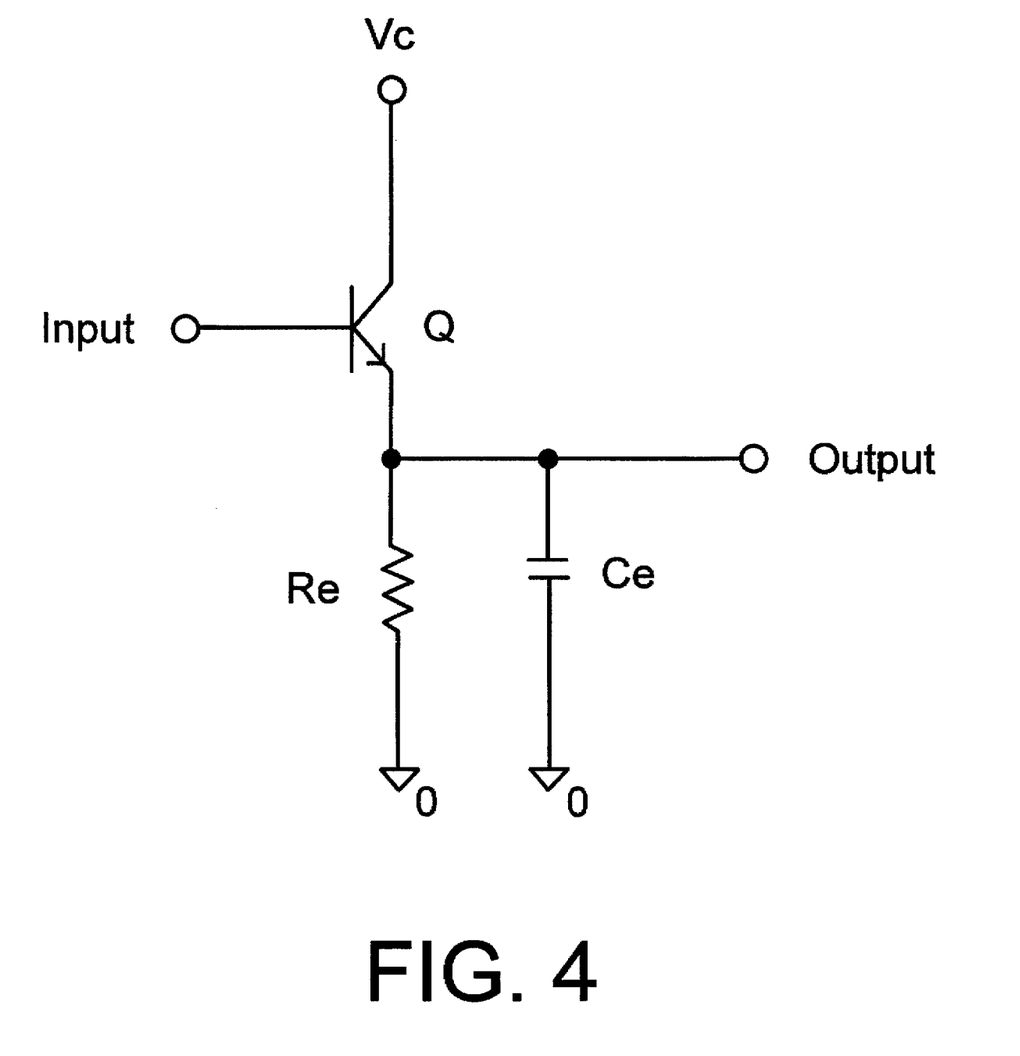
FIG. 4 illustrates an exemplary embodiment of a pulse stretcher for use in a pulse detection apparatus according to the present invention.

FIG. 4 illustrates an exemplary circuit configuration of a pulse stretcher which can be used in accordance with exemplary embodiments of the present invention. As shown in FIG. 4, a pulse of received energy is supplied at an input point to the base of a transistor Q. The collector of the transistor Q is connected to a voltage supply Vc, and the emitter is connected to ground via a resistor Re and a capacitor Ce connected in parallel. Because the transistor Q turns off, the voltage in the capacitor Ce decays causing a tail to be added to the pulse output, and thus "stretching" the pulse.

FIGS. 5a–5e graphically represent a received signal which includes a pulse as it is processed in channel 1 of the exemplary FIG. 3 pulse detection apparatus. The effect on the pulse due to time delay has been omitted for clarity. Further, in the figures, the received signal and the noise are drawn separately for explanatory purposes. In the actual circuit, the received signal and the noise are superposed and mixed together.

Figure 5A:
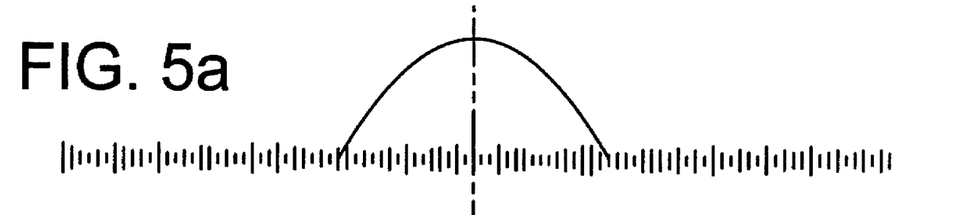
FIGS. 5a–5e graphically represent a pulse travelling through a first channel in an exemplary pulse detection apparatus according to the present invention.
Figure 5B:
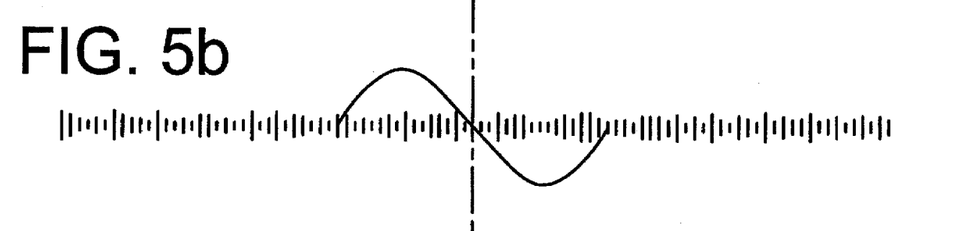

Referring to FIG. 5a, an incoming electromagnetic or optical pulse of energy, represented by a solid line, is input in the presence of noise, represented by short, consecutive vertical lines. The pulse can be of any pulse width and can have any desired bandwidth, including pulses having ultrashort pulse widths and bandwidths on the order of 50 Megahertz or greater. The pulse is differentiated, resulting in a bipolar signal that is smaller in amplitude with a lower SNR, as represented in FIG. 5b.

Figure 5C:
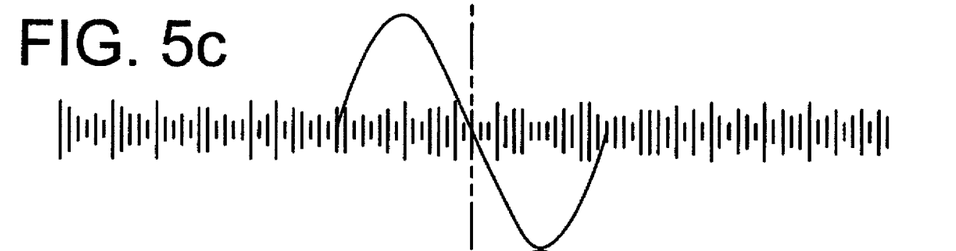
Figure 5D:
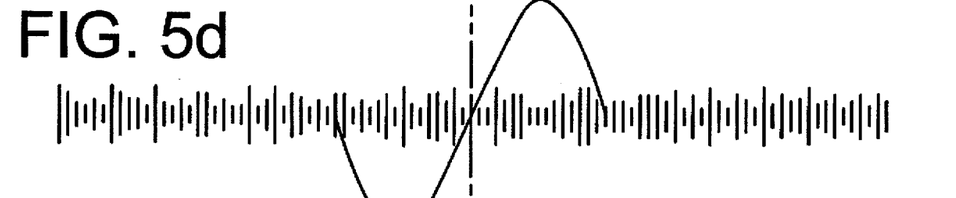

FIG. 5c shows the result of amplifying the signal in order to return it to its original amplitude. As can be seen from FIG. 5c, since the noise is amplified along with the pulse, the SNR is degraded. The amplified signal is the inverted, as shown in FIG. 5d, and fed into the FIG. 3 threshold comparator 350 that is set at the least time-variant level for the shape of the pulse of received energy. For example, the threshold may be set to zero, resulting in a waveform shown in FIG. 5e. For symmetrical pulses with one inflection point and relatively little low frequency content, the output of the FIG. 3 threshold comparator 350 will be a pulse whose rising edge is located at the centroid of the incoming pulse. However, for pulses with more than one inflection point (for example, due to noise at the ideal inflection point of the pulse), the point at which the rising edge is located can be at a location other than the centroid of the incoming pulse. Further, for nonsymmetrical pulses, such as a sawtooth pulse, the point of which the rising edge is located will be at or near the point of inflection which may or may not correspond to the centroid of the incoming pulse.

Figure 5E:
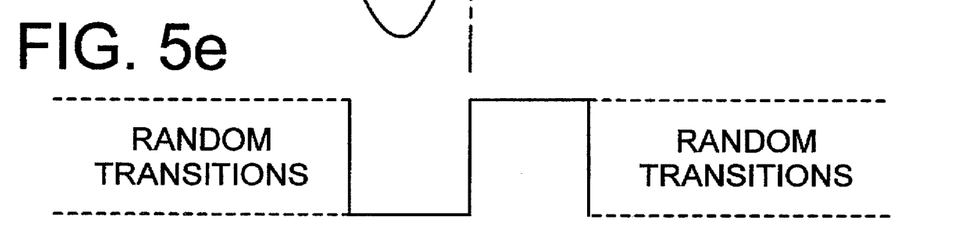

As shown in FIG. 5e, in the absence of the received pulse, the output of the threshold comparator 350 can transition randomly due to noise as indicated, for purposes of illustration, by random waves between the dashed lines. However, when the negative portion of the bipolar signal representing the received pulse is detected, the threshold comparator 350 is forced to remain low, as indicated by the solid lines. When the positive portion of the bipolar signal is detected, the output of the threshold comparator 350 is forced high, as shown by the solid lines. When the signal returns to a level below the noise, the threshold comparator 350 begins to transition randomly again.

Figure 6A:
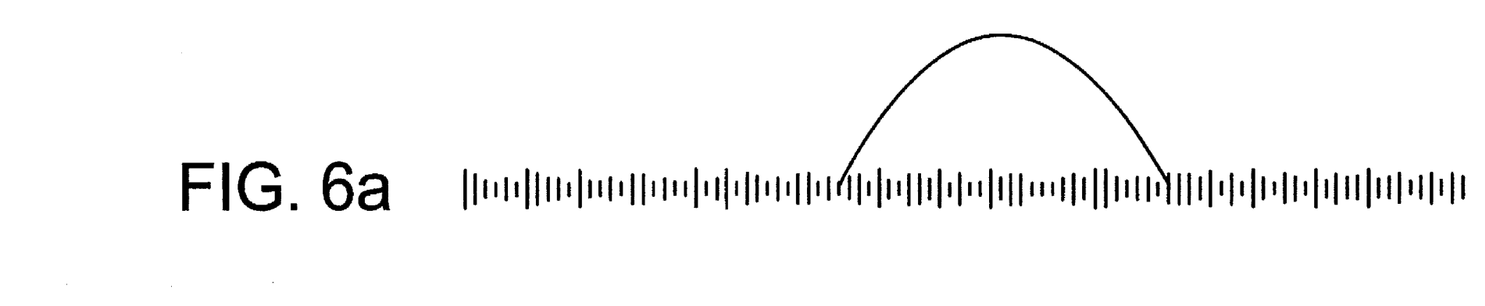
FIGS. 6a–6c graphically represent a pulse travelling through a second channel in an exemplary pulse detection apparatus according to the present invention.
Figure 6B:
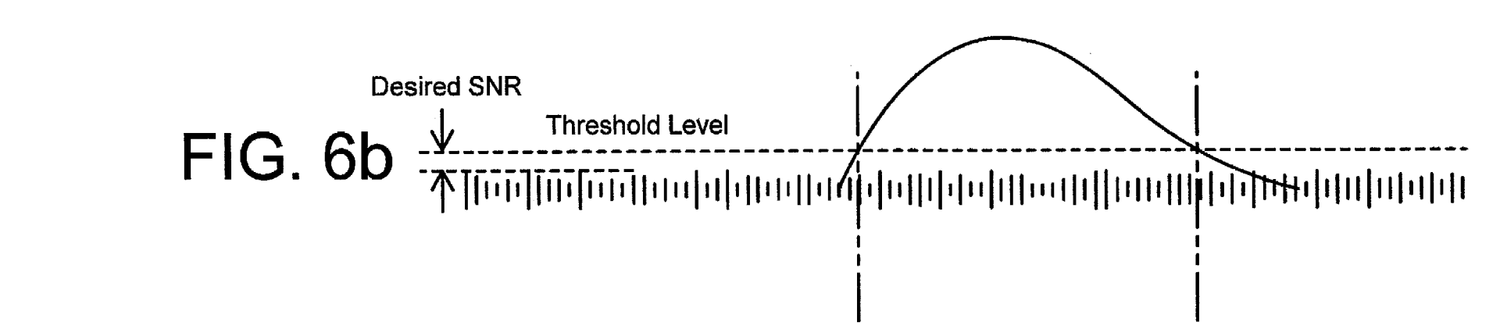
Figure 6C:
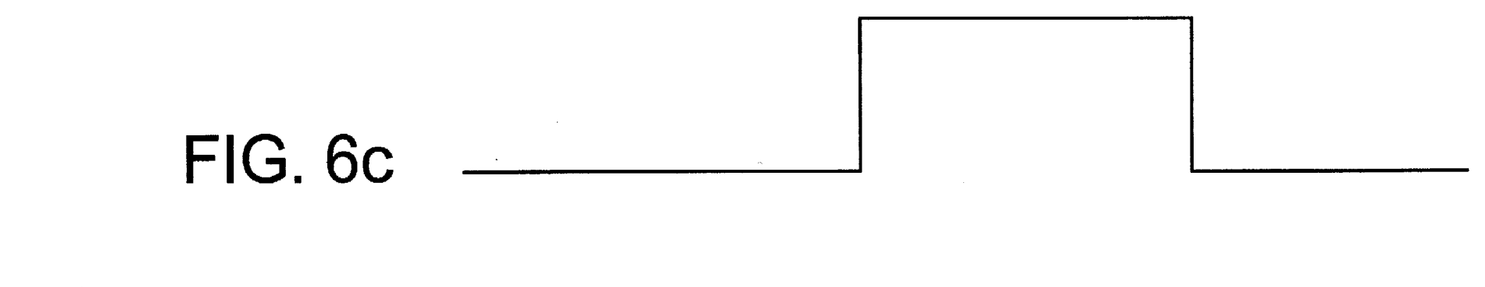

FIGS. 6a–6c graphically represent a pulse of received energy supplied to channel 2 in the exemplary FIG. 3 pulse detection apparatus. Just like FIGS. 5a–5e, the noise and the received signal are drawn separately for explanatory purposes. In the actual circuit, the received signal and the noise are superposed and mixed together. Referring to FIG. 6a, a pulse of energy, represented by a solid line, is input in the presence of noise, represented by short, consecutive vertical lines. As shown in FIG. 6b, the pulse is stretched in order to create a wider pulse that will fully envelop the signal created in channel 1 and thus satisfy setup and timing conditions of the threshold comparator and gating logic. The voltage threshold of FIG. 3 comparator 370 is set at a level above the noise that yields a desired SNR for the whole system. Again, this threshold can be established, for example, empirically via use of an oscilloscope. FIG. 6c shows the output of the FIG. 3 threshold comparator 370, which represents the output of channel 2.

Figure 7A:
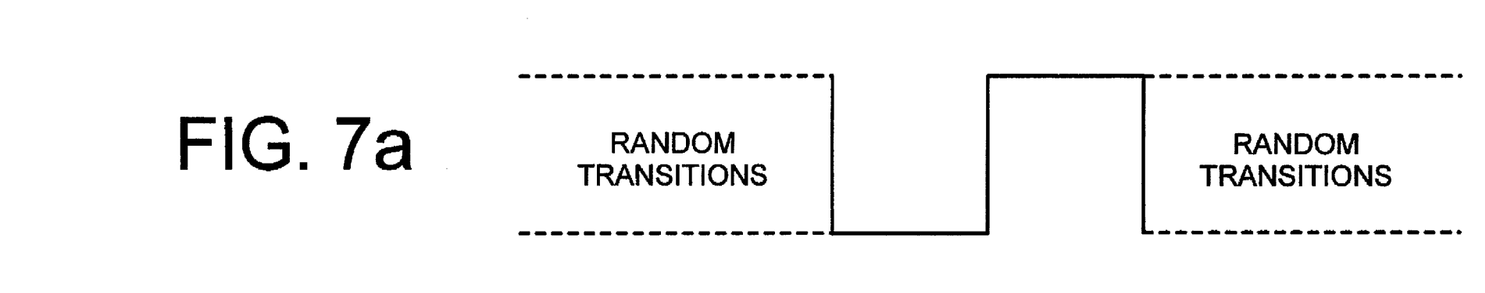
FIGS. 7a–7c graphically represent a recombination of first and second channels in an exemplary pulse detection apparatus according to the present invention.
Figure 7B:
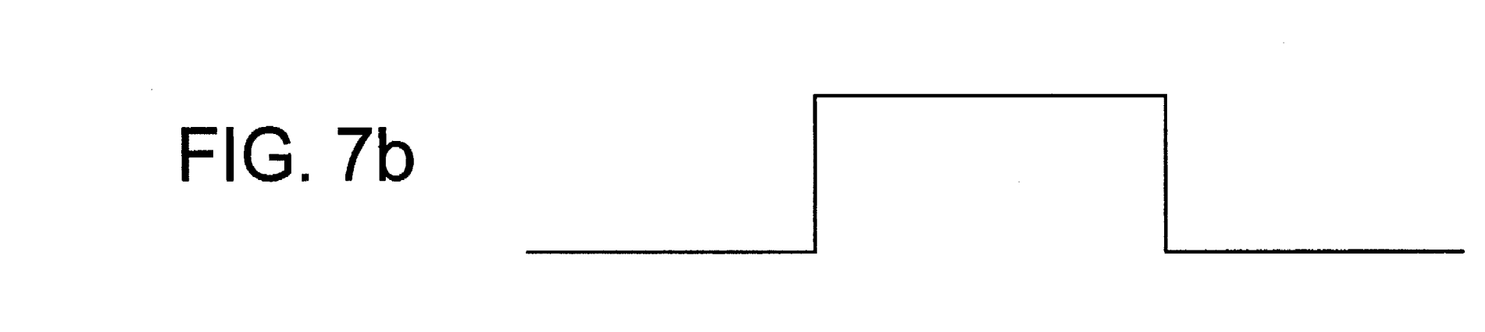
Figure 7C:
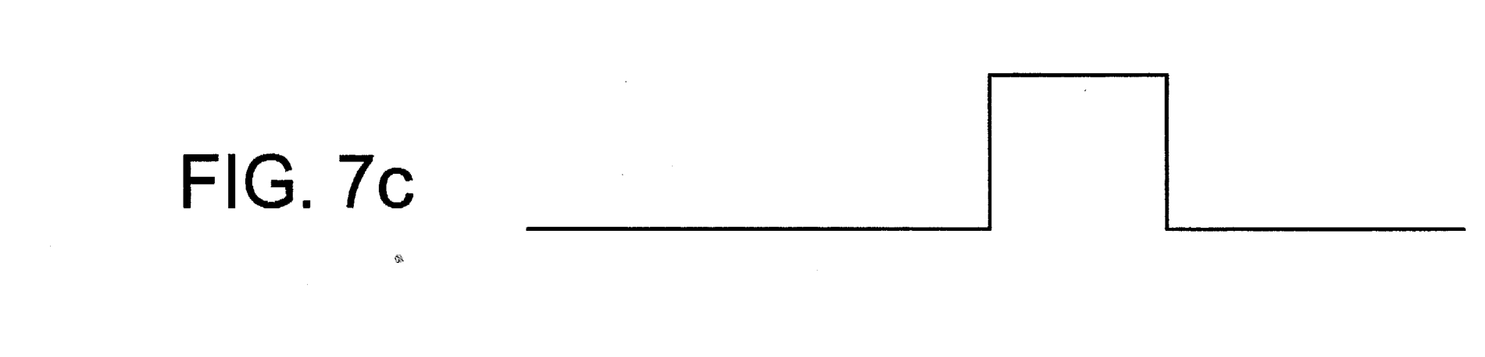

FIGS. 7a–7c graphically represent the recombination of the first and second channels in the system. Referring to FIG.

7a, an output of channel 1 includes an edge that coincides with a change in a polarity of slope of the pulse of received energy, the edge being represented by solid lines in FIG. 7a. Further, the channel 1 output includes random transitions, represented by random waves between dashed lines. FIG. 7b shows the output of channel 2 which includes a reference pulse, referred to herein as "conditional compare" pulse, that is derived for the received signal and that is used to remove the random transitions from the output of channel 1.

FIG. 7c shows the result of logically combining channel 1 and channel 2 via the FIG. 3 AND gate 380. A single pulse is created, with a rising edge that coincides with the change in polarity of the slope of the pulse of received energy. For example, for a sinusoidally-shaped pulse of received energy with one inflection point, the rising edge of the detected pulse coincides with the centroid of the pulse. For this to occur, the set up time of the AND gate 380 must be taken into account when determining the appropriate place to insert a delay into the circuit.

Figure 8:
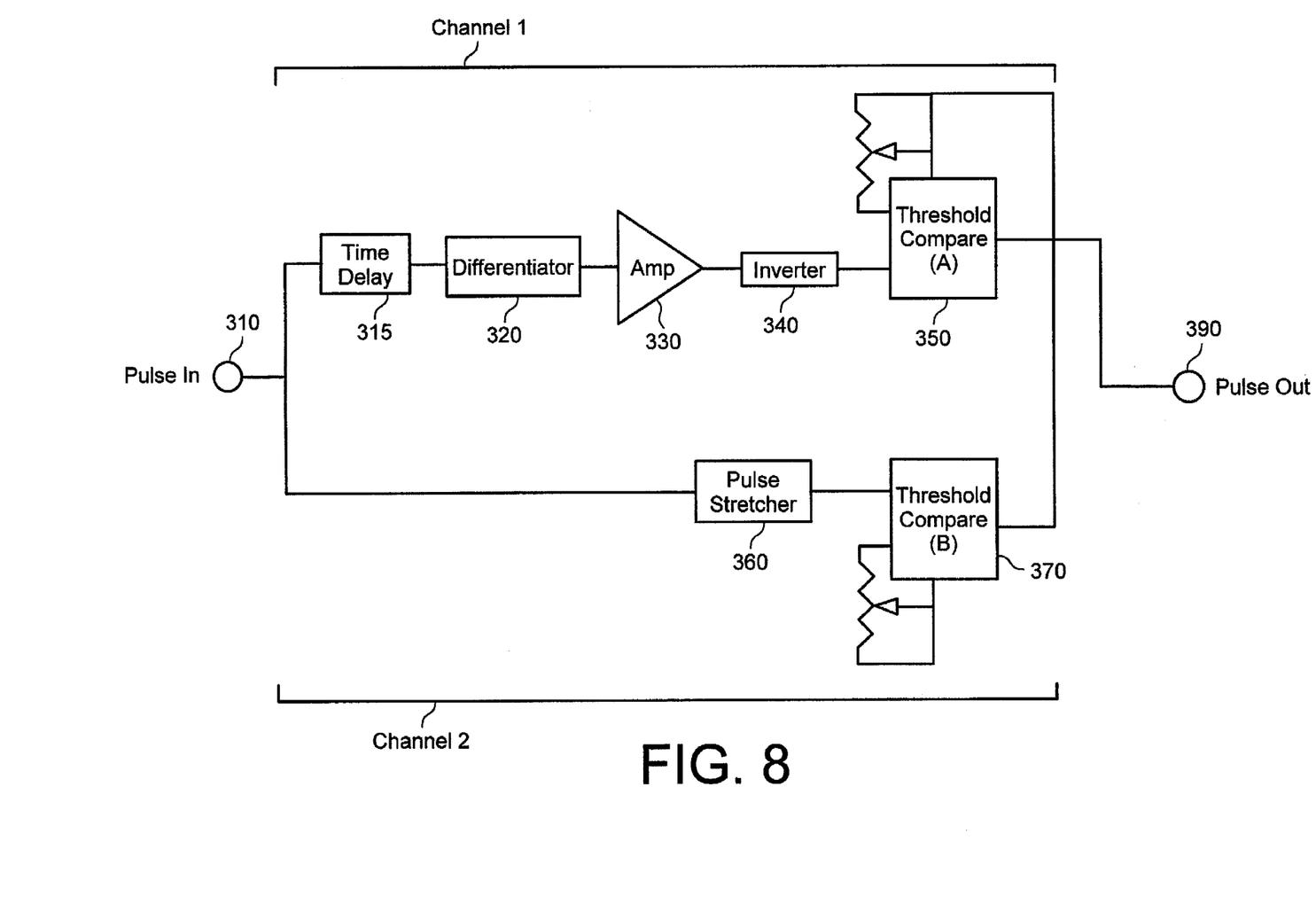
FIG. 8 depicts a block diagram of a pulse detection apparatus according to a second exemplary embodiment of the present invention.

FIG. 8 depicts a block diagram of a pulse detection apparatus according to a second exemplary embodiment of the present invention. Referring to FIG. 8, the pulse detection circuitry is the same as that shown in FIG. 3, except that AND gate 380 is not needed. The output of threshold comparator 370 from channel 2 is fed to the reference level of threshold comparator 350 in channel 1. When the threshold comparator 370 transitions, it slightly changes the reference level of the threshold comparator 350, thus accomplishing the gating function without the use of an additional logic component. While the embodiment depicted in FIG. 8 can be configured to require less power consumption than that depicted in FIG. 3, it can also produce a less clear output due to the absence of a dedicated logic component for establishing clean pulse transitions.

Figure 9A:
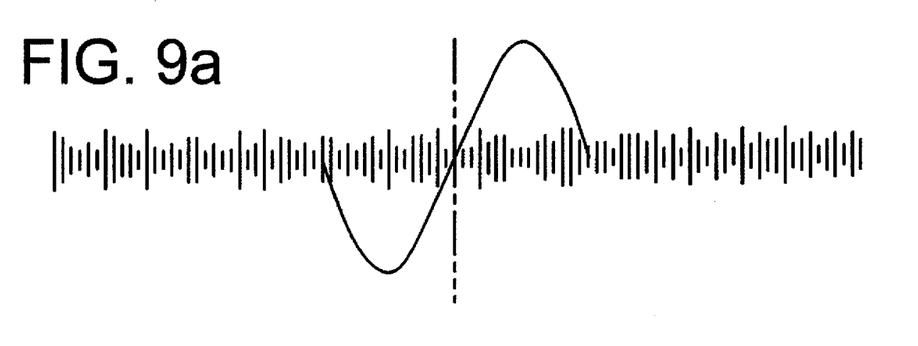
FIGS. 9a–9c graphically represent pulses associated with the second exemplary embodiment of FIG. 8.
Figure 9B:
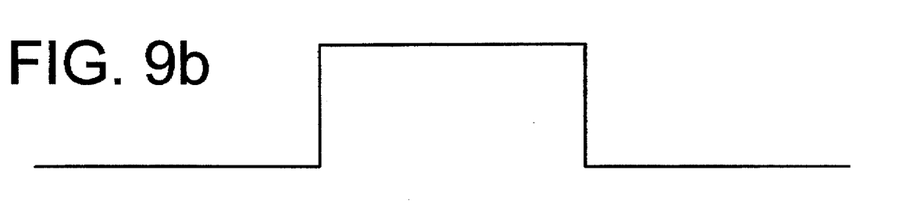
Figure 9C:
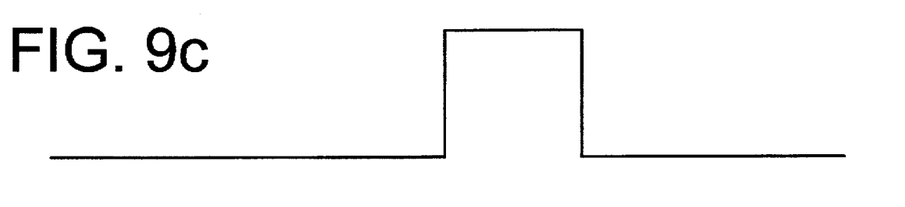

FIGS. 9a–9c illustrate waveforms associated with the exemplary FIG. 8 embodiment. More particularly, FIG. 9a illustrates an exemplary channel 1 signal which is supplied to threshold comparator 350 in channel 1. FIG. 9b illustrates an exemplary output waveform of channel 2 which is supplied as the reference level for threshold comparator 350. The output of threshold comparator 350, given the inputs represented by the waveforms of FIGS. 9a and 9b, is illustrated in FIG. 9c as being similar to that of FIG. 7c. As with the waveforms of FIGS. 5 and 6, noise and received signal components are shown separately for explanatory purposes. In the actual circuit, the received signal and the noise are superposed and mixed together.

According to the embodiments described above, discrete electronic components such as capacitors, resistors, transistors, and so forth are used to accomplish each of the individual tasks at each stage in both channels. Alternately, the invention can also be implemented using digital and/or analog integrated circuits to accomplish each of the tasks, or all of the functions can be implemented on a single analog or digital integrated circuit.

Figure 10:
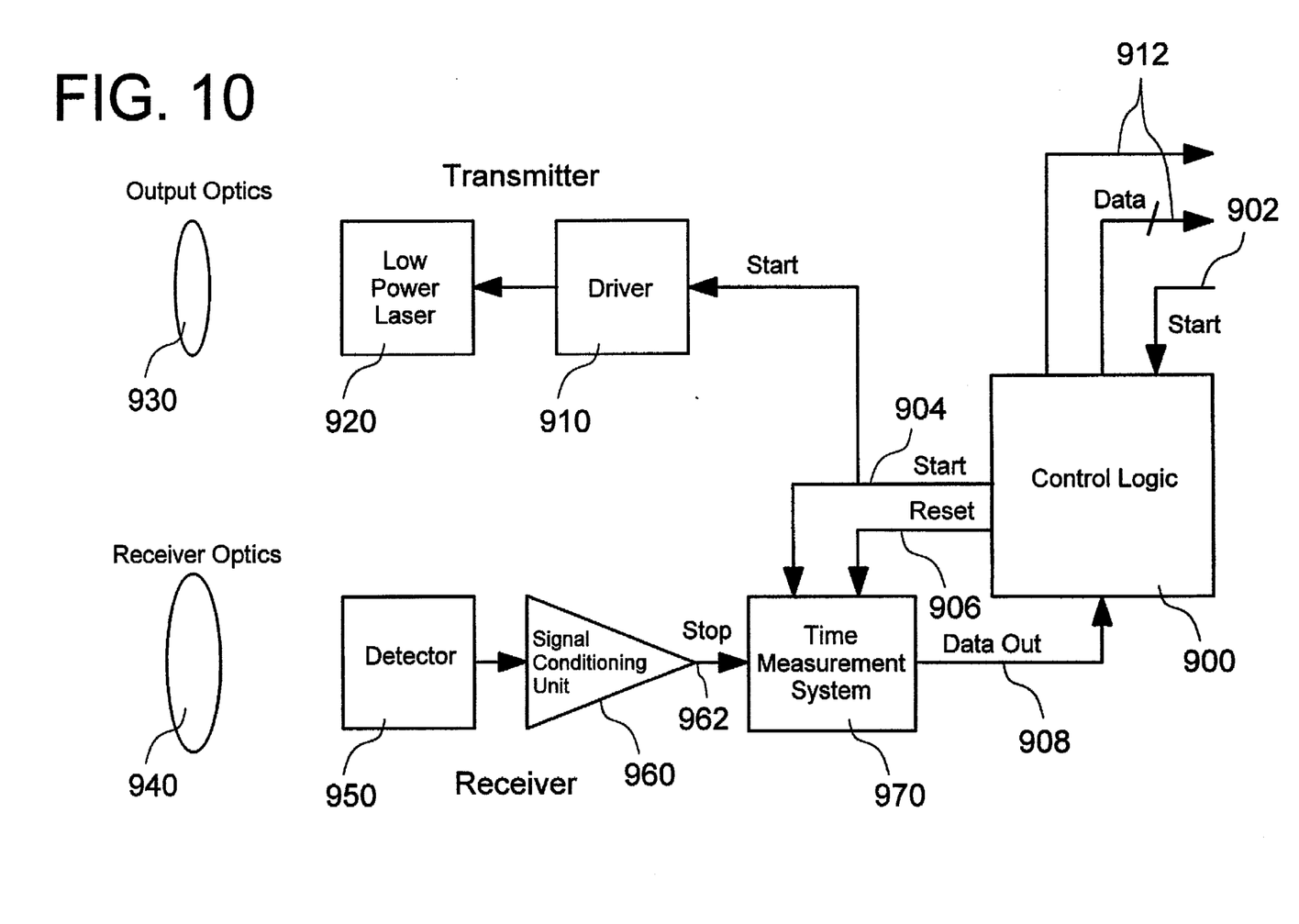
FIG. 10 depicts a block diagram of an exemplary laser radar system which can be implemented in accordance with exemplary embodiments of the present invention.

FIG. 10 depicts a block diagram of an exemplary laser radar system in accordance with the present invention. The laser radar system can, for example, be mounted on a vehicle. Referring to FIG. 10, a start signal received on start signal line 902 is transmitted via control logic circuitry 900 to a driver 910 via start signal line 904. The driver 910 transmits a signal to a relatively low power laser 920, causing the laser 920 to output laser energy via the output optics 930 to an object, such as a vehicle. The waveform of the output laser energy can be a predetermined waveform having a short pulsewidth of desired resolution. Exemplary embodiments are directed to use of any laser, including conventional, readily available lasers which can be obtained off-the-shelf. The laser energy is reflected and received in the receiver optics 940. The detector 950 detects the laser energy from the receiver optics 940 and transmits the laser energy to a signal conditioning unit 960. The The signal conditioning unit 960 processes the laser energy and outputs a pulse using pulse detector circuitry such as that described with respect to FIGS. 1–9. The pulse is output via a stop signal 962 to the time measurement system 970. The time measurement system 970 also receives the start signal such that time-of-flight information can be maintained using, for example, a counter which is enabled by the start signal and disabled by the received pulse. The counter can subsequently be reset via a reset signal on reset signal line 906 from the control logic circuitry 900. The time measurement system 970 measures the pulse timing and outputs a data out signal on data signal line 908 to the control logic circuitry 900. Finally, the control logic circuitry 900 outputs a data signal on output data lines 912.

It will be appreciated by those of ordinary skill in the art that the present invention can be embodied in other specific forms without departing from the spirit or essential characteristics thereof. For example, although the embodiments above have been described as applicable to automotive radar systems, the invention is applicable to any optical or electronic pulse detection system. Other applications can, for example, include bar code readers, time spectroscopy, computer hard disk drives, electromagnetic (EM) radars, and any laser radar system which relies on accurate pulse detection. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. An apparatus for detecting pulse energy in the presence of noise, comprising:

means for receiving said pulse energy;

means for determining a change in polarity of slope of said received pulse energy;

means for producing a reference signal having a width related to a width of said received pulse energy; and means for combining said change in polarity of slope and said reference signal to produce an output corresponding to said pulse energy.

2. The apparatus of claim 1, wherein said means for determining comprises a differentiator for differentiating said received pulse energy and producing a differentiated output.

3. The apparatus of claim 2, wherein said means for determining further comprises an amplifier and an inverter for amplifying and inverting said differentiated output.

4. The apparatus of claim 3, wherein said means for determining further comprises a first threshold comparator which compares said amplified, inverted and differentiated output to a first predetermined threshold.

5. The apparatus of claim 4, wherein said means for determining further comprises means for delaying said received pulse energy.

6. The apparatus of claim 1, wherein said means for producing comprises pulse stretching means for stretching said received pulse energy to produce a stretched reference signal with a width related to said width of said received pulse energy.

7. The apparatus of claim 6, wherein said means for producing further comprises a second threshold comparator for comparing said stretched reference signal with a second predetermined threshold which establishes a desired signal-to-noise ratio.

8. The apparatus of claim 7, wherein said first predetermined threshold is set at a point which is least time-variant for said received pulse energy, and said second predetermined threshold is set at a level above said noise that guarantees a desired signal-to-noise ratio.

9. The apparatus of claim 1, wherein said means for combining comprises an AND gate.

10. The apparatus of claim 1, wherein said means for combining comprises a threshold comparator with said reference signal as one input and said determined change of polarity in slope as the other input.

11. The apparatus of claim 1, wherein said output is relatively time-invariant with respect to amplitude variations of said received pulse energy.

12. The apparatus of claim 1, wherein for received pulse energy with one inflection point and little low frequency content, said output has a rising edge located at a point corresponding to the center of said received pulse energy.

13. The apparatus of claim 1, wherein said received pulse energy is laser energy, and said apparatus is a laser radar device.

14. An apparatus for detecting a pulse of energy in the presence of noise, comprising:

an input for receiving energy;

in a first channel, a differentiator for differentiating a pulse of said received energy to produce a differentiated output, an amplifier and an inverter for amplifying and inverting the differentiated output, and a first threshold comparator which compares the amplified, inverted and differentiated output with a first predetermined threshold; and in a second channel, a pulse stretching circuit for stretching said pulse of said received energy to produce a stretched pulse, said stretched pulse being time-aligned with said amplified, inverted and differentiated output, and a second threshold comparator for comparing said stretched pulse to a second predetermined threshold for establishing a desired signal-to-noise ratio and producing an output signal, wherein said amplified, inverted and differentiated output and said output of said second channel are combined to produce a detected pulse of energy.

15. The apparatus of claim 14, wherein the first predetermined threshold is set at a point which is the least time-variant for said pulse of said received energy and the second predetermined threshold is set at a level above the noise that guarantees a desired signal-to-noise ratio.

16. The apparatus of claim 14, further comprising, in the first channel, delay means for delaying said pulse of said received energy.

17. The apparatus of claim 14, further comprising an AND gate for combining an output of the first threshold comparator and an output of the second threshold comparator to produce said detected pulse of energy.

18. The apparatus of claim 14, wherein the output of the second threshold comparator and said amplified, inverted and differentiated output are combined in the first threshold comparator to produce a pulse of received energy.

19. The apparatus of claim 14, wherein said detected pulse of energy is relatively time-invariant with respect to amplitude variations.

20. The apparatus of claim 14, wherein for a pulse of received energy with one inflection point and little low frequency content, said detected pulse of energy has a rising edge located at the center of said pulse of said received energy.

21. A method for detecting a pulse of energy in the presence of noise, comprising the steps of:

receiving energy;

determining a change in polarity of slope of a pulse of said received energy;

producing a reference pulse having a width related to a width of said pulse of received energy; and combining said change in polarity of slope and said reference pulse to produce a pulse output.

* * * * *